(No Model.)
J. F. SULLIVAN.
TOOL HANDLE.
No. 432,338. Patented July 15, 1890.
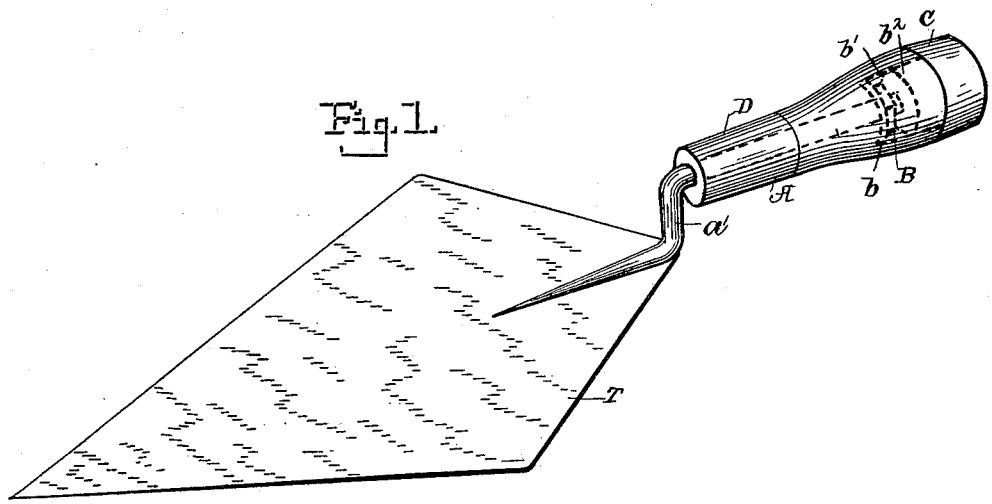
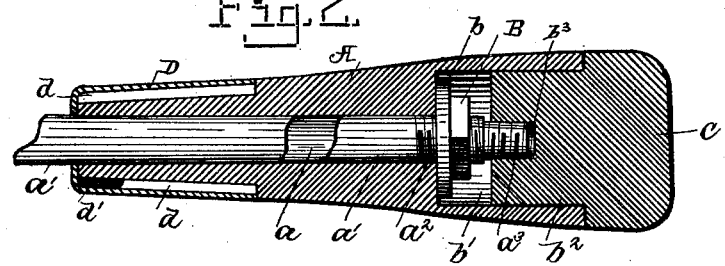
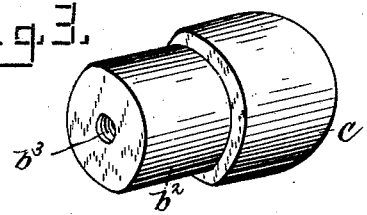
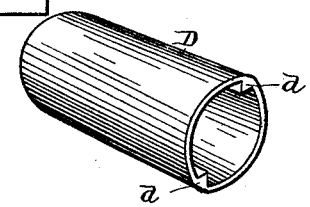
Witnesses.
Wm. S. Hodges.
Robert Jennings.
Inventor.
James F. Sullivan.
By
Patrick O'Farrell,
Attorney.

UNITED STATES PATENT OFFICE.

JAMES F. SULLIVAN, OF HARTFORD, CONNECTICUT.

TOOL-HANDLE.

SPECIFICATION forming part of Letters Patent No. 432,338, dated July 15, 1890.

Application filed February 15, 1890. Serial No. 340,520. (No model.)

*To all whom it may concern:*

Be it known that I, JAMES F. SULLIVAN, a citizen of the United States of America, residing at Hartford, in the county of Hartford and State of Connecticut, have invented certain new and useful Improvements in Tool-Handles, of which the following is a specification, reference being had therein to the accompanying drawings.

This invention pertains to certain new and useful improvements in tool-handles, having for its object the provision of simple and highly-efficient improved means for firmly attaching a handle to a tool, so that the same will remain rigid and have no movement independent of such tool.

My invention is designed more especially for attaching the handle to an ordinary bricklayer's trowel; and it comprises the details, construction, combination, and arrangement of parts, substantially as hereinafter fully set forth, and particularly pointed out in the claim.

In the accompanying drawings, Figure 1 is a view in perspective of a trowel with my invention applied thereto. Fig. 2 is a longitudinal sectional view. Fig. 3 is a detail perspective view of the end cap, and Fig. 4 is a detail perspective of the ferrule.

Referring to the drawings, A designates a handle having a central narrow longitudinal hole or opening $a$, through which is inserted the tang $a'$ of a trowel T. The tang $a'$ is provided on its outer end with a right-hand screw-thread $a^2$ and a left-hand screw-thread $a^3$, formed in the upper reduced portion of said tang. A threaded nut B is designed to fit on the screw-thread $a^2$ of tang $a'$, said nut bearing against a washer $b$, resting on the bottom of an opening or recess $b'$ in the handle A, adjacent to opening $a$, and by means thereof the handle is held as against movement independent of the trowel. Over the outer end of recess $b$ in handle A is fitted a cap C, having a central projection $b^2$ fitting snugly in said recess and provided with an internal threaded hole or opening $b^3$, wherein the threaded end $a^3$ of tang $a'$ is designed to project to firmly hold said cap over said recess.

D is a ferrule fitted on the lower end of handle A. This ferrule is provided on its inner surface with two lugs or projections $d$, which are designed to fit snugly in recesses $d'$, made therefor in the lower reduced end of handle A, to prevent the loosening of the ferrule and the turning thereof on said handle.

It will be seen that I have produced a tool-handle that is both simple and durable, and one that may be firmly united to a trowel or other tool and held against all movement independent thereof, thereby overcoming the objections to the handles now in general use, and also that when the handle becomes loose it can readily be tightened by screwing nut B on tang $a'$, and when worn or injured can be readily replaced.

I claim as my invention—

As an improved article of manufacture, the trowel or other tool herein described, having a tang provided with a screw-thread $a^2$, a reduced end having a screw-thread opposite to said former thread, the handle A, having a central hole or opening and an outer end recess, the nut B, working on said screw-thread $a^2$, the interposed washer $b$, and the end cap having its reduced portion fitting in said end recess of the handle and provided with a threaded hole or opening engaging the thread on said reduced end of the tang, substantially as set forth.

In testimony whereof I affix my signature in presence of two witnesses.

JAMES F. $\overset{\text{his}}{\times}$ SULLIVAN.
<div style="text-align:center">mark</div>

Witnesses:
 DENNIS J. MURPHY,
 JOHN E. HIGGINS.